(12) United States Patent
Schroeder

(10) Patent No.: US 7,574,878 B2
(45) Date of Patent: Aug. 18, 2009

(54) SYSTEM AND METHOD FOR CONTROLLING THE WATER FLOW OF HOUSEHOLD APPLIANCES

(76) Inventor: Karl Siegfried Schroeder, 6822 Salem Ave., Clayton, OH (US) 45315

( * ) Notice: Subject to any disclaimer, the term of this patent is extended or adjusted under 35 U.S.C. 154(b) by 58 days.

(21) Appl. No.: 11/834,192

(22) Filed: Aug. 6, 2007

(65) Prior Publication Data
US 2008/0169034 A1 Jul. 17, 2008

Related U.S. Application Data

(60) Provisional application No. 60/835,962, filed on Aug. 7, 2006.

(51) Int. Cl.
*D06F 39/08* (2006.01)
(52) U.S. Cl. .......................... 68/12.19; 68/207; 137/312; 174/47; 138/119
(58) Field of Classification Search .................. 68/207; 138/118, 119, 121, 122; 134/184, 198; 174/47; 137/312
See application file for complete search history.

(56) References Cited

U.S. PATENT DOCUMENTS

| 2,440,668 A | * | 4/1948 | Tarbox | 174/95 |
| 2,722,237 A | * | 11/1955 | Rosel | 248/317 |
| 2,890,264 A | * | 6/1959 | Duff | 174/47 |
| 3,034,085 A | | 5/1962 | Pauler et al. | |
| 3,163,707 A | * | 12/1964 | Darling | 174/47 |
| 3,211,823 A | * | 10/1965 | Brown et al. | 174/47 |
| 3,273,600 A | * | 9/1966 | Swan | 138/122 |
| 3,417,782 A | * | 12/1968 | Adelbert | 137/624.11 |
| 3,466,006 A | | 9/1969 | Livingston | |
| 3,788,347 A | * | 1/1974 | Guth | 137/355.17 |
| 3,823,248 A | * | 7/1974 | Christie et al. | 174/16.2 |
| 3,917,499 A | * | 11/1975 | Holden et al. | 156/144 |

(Continued)

FOREIGN PATENT DOCUMENTS

AU 679668 * 7/1997

(Continued)

OTHER PUBLICATIONS www.plumbingsupply.com, "Automatic Washing Machine Water Shutoff Valve", published Feb. 5, 2005, 3 pages.

(Continued)

*Primary Examiner*—Frankie L Stinson
(74) *Attorney, Agent, or Firm*—Brooks Kushman P.C.

(57) ABSTRACT

A flow control system for a water supply comprises a washing appliance, a valve, a stretch cable, and a stretch hose. The appliance is in fluid communication with the supply. The appliance includes a timer circuit configured to generate control signals. The valve is positioned external to the appliance and coupled to the supply to control a flow of water to the appliance in response to the control signals. The stretch cable is coupled between the valve and the appliance for delivering the control signal to the valve. The stretch hose is coupled to the valve and the appliance for delivering water to the appliance and is capable of being extended from a first length to a second length between the valve and the appliance. The stretch cable is positioned within the stretch hose and capable of being extended between the first and second lengths independent of the stretch hose.

20 Claims, 3 Drawing Sheets

U.S. PATENT DOCUMENTS

| | | | | |
|---|---|---|---|---|
| 3,928,715 | A | * | 12/1975 | Holden ......................... 174/47 |
| 4,064,355 | A | * | 12/1977 | Neroni et al. ................. 174/47 |
| 4,167,645 | A | * | 9/1979 | Carey .......................... 174/47 |
| 4,186,778 | A | * | 2/1980 | Carey ......................... 138/103 |
| 4,277,640 | A | * | 7/1981 | Kutnyak et al. ............... 174/47 |
| 4,368,348 | A | * | 1/1983 | Eichelberger et al. ......... 174/47 |
| 4,394,057 | A | | 7/1983 | Williams et al. |
| 4,515,423 | A | * | 5/1985 | Moore et al. ................. 439/502 |
| 4,545,947 | A | * | 10/1985 | Bozoarth et al. ............. 264/150 |
| 6,003,536 | A | | 12/1999 | Polverari et al. |
| 6,024,132 | A | * | 2/2000 | Fujimoto .................... 138/122 |
| RE36,833 | E | * | 8/2000 | Moore et al. ................. 174/47 |
| 6,167,883 | B1 | | 1/2001 | Beran et al. |
| 6,186,181 | B1 | * | 2/2001 | Schippl ...................... 138/112 |
| 6,192,940 | B1 | * | 2/2001 | Koma et al. ................. 138/122 |
| 6,427,276 | B1 | | 8/2002 | Comer |
| 6,779,551 | B2 | | 8/2004 | Wiemer et al. |
| D499,794 | S | | 12/2004 | Comer |
| 2003/0098084 | A1 | * | 5/2003 | Ragner et al. ............... 138/129 |
| 2003/0111126 | A1 | | 6/2003 | Moulton et al. |

FOREIGN PATENT DOCUMENTS

| | | | |
|---|---|---|---|
| DE | 29 19 745 | * | 11/1980 |
| DE | 34 14 913 | * | 10/1985 |
| DE | 37 43 915 | * | 7/1989 |
| DE | 39 31 528 | * | 4/1991 |
| DE | 299 12 947 | * | 4/2000 |
| DE | 100 46 922 | * | 4/2002 |
| DE | 102 07 556 | * | 9/2003 |
| EP | 0 222 174 A2 | * | 5/1987 |
| EP | 0 527 297 A1 | * | 2/1993 |
| FR | 2 825 385 | * | 12/2002 |
| JP | 10-220654 | * | 8/1998 |
| WO | WO 84/04148 A1 | * | 10/1984 |

OTHER PUBLICATIONS www.plumbingsupply.com "FloodStops", published Oct. 4, 2003, 3 pages.
Aqua Managers Inc., FloodStop, "Failure Activated Flood Protection", 2 pages.
Plumbingwarehouse.com, Flood Prevention Systems, "FloodStop System for Washing Machines", 9 pages.
Watts, Water Safety & Flow Control, "IntelliFlow Automatic Washing Machine Shutoff Valves", 4 pages.
www.plumbingsupply.com, "Automatic Washing Machine Water Shutoff Valve", 5 pages.
Watts, "Prevent Catastrophic Water Damage With Watts FloodSafe Auto-Shutoff Connector", 2 pages.

* cited by examiner

SYSTEM AND METHOD FOR CONTROLLING THE WATER FLOW OF HOUSEHOLD APPLIANCES

CROSS-REFERENCE TO RELATED APPLICATIONS

This application claims the benefit of U.S. provisional application Ser. No. 60/835,962 filed on Aug. 7, 2006; which is hereby incorporated by reference in its entirety.

BACKGROUND

1. Technical Field

The embodiments described herein generally relate to a system and method for controlling the water flow to household appliances.

2. Background Art

Various household appliances use water to perform various tasks. For example, such household appliances include clothes washing machines and dishwashers. The appliances are generally coupled to a water supply in the house via a plurality of flexible hoses. Original equipment manufacturers for the appliances provide control valves internal to the appliance for controlling the flow of water. In some cases, the flexible hoses may burst due to high amounts of pressure present at the water supply. While the water supply includes valves that can be turned off to reduce the likelihood of the hoses bursting, users may forget to shut off the valves when the appliance is not in use.

Some aftermarket manufacturers provide a system that includes automatic shutoff valves positioned at the water supply and a water detection device to detect the presence of water on the floor. The system closes the valve in response to detection device detecting water on the floor. While such a system may be useful, the system does not mitigate the potential for the hose to burst due to high pressure at the water supply. Other aftermarket manufacturers provide a system having water flow shut off valves positioned external to the appliance and proximate to the water supply to control the flow of water into the appliance. As the system senses current flow to the appliance, the system opens the valves to allow water to pass to the appliance while the appliance controls internal valves to open to allow water to pass into the tub. While this system may also be useful, the addition of the valves to the water supply creates a condition whereby the valves located internally within the appliance become redundant.

In most instances, original equipment manufacturers provide rubber hoses that may be manipulated to allow the consumer to mate the hose to the water supply in the house. The rubber hoses may be rotated or twisted to allow the consumer to mate the hoses to the water supply in the house. The hoses equipped with the household appliance generally have a length of approximately four feet. However, in the event a consumer needs a longer hose, the consumer may have to travel to a local hardware store to purchase a longer hose since the rubber hose provided with the original appliance cannot be stretched to a longer length.

Some consumers may purchase a steel braided hose to eliminate concerns for bursting hoses. In addition, consumers have the option of purchasing steel braided hoses at lengths that are generally greater than the length of the flexible hoses provided by the original equipment manufacturer. While the steel braided hoses may be effective, such hoses may be expensive. Particularly in the case where a longer braided hoses is needed in order to couple the appliance to the water supply.

Accordingly, it would be desirable to provide for a stretch hose and a stretch cable with an originally equipped appliance to ensure that the hose has sufficient length to mate with the water supply of the house. In addition, it would be desirable to eliminate redundancy with respect to valves provided by the original equipment manufacturer and valves provided by an aftermarket provider.

SUMMARY

In one embodiment, a flow control system for a household supply comprises an appliance, a valve, a stretch cable, and a stretch hose. The household appliance is in fluid communication with the supply. The appliance includes a timer circuit configured to generate control signals. The valve is positioned external to the appliance and coupled to the supply to control a flow of water to the appliance in response to the control signals. The stretch cable is coupled between the valve and the appliance for delivering the control signal to the valve. The stretch hose is coupled to the valve and the appliance for delivering water to the appliance and is capable of being extended from a first length to a second length between the valve and the appliance. The stretch cable is positioned within the stretch hose and capable of being extended between the first and second lengths independent of the stretch hose.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
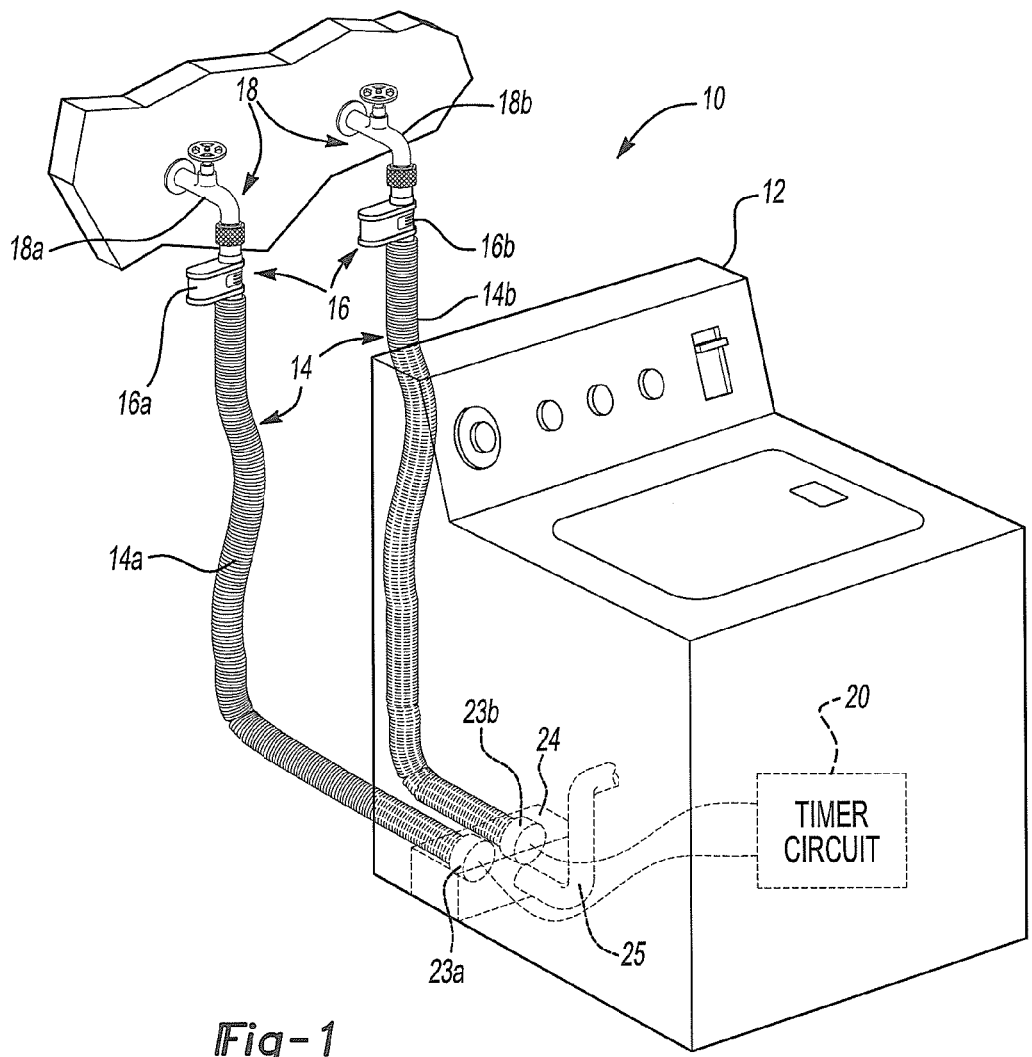
FIG. 1 depicts a water flow control system for an appliance in accordance to one embodiment of the present invention.

FIG. 1 depicts a water flow control system 10 in accordance to one embodiment of the present invention. The system 10 may be implemented for any type of electrical appliance that draws water from a water source in a residential establishment (e.g., home, apartment, condominium, or other abode lived in by an individual) and/or a commercial establishment (e.g., laundromats). The electrical appliances may include but are not limited to a clothes washing machine and a dishwasher. The system 10 generally comprises a household appliance 12, one or more stretch hoses 14, and one or more valves 16. A water supply 18 disposed in the residential establishment provides water to the appliance 12. The water supply 18 includes first and second faucets 18a, 18b. The first faucet 18a may be adapted to provide hot water and the second faucet 18b may be adapted to provide cold water.

The stretch hoses 14 includes first and second stretch hoses 14a, 14b. The first and second stretch hoses 14a, 14b may be made of polyethylene or vinyl or other suitable material. The first and second stretch hoses 14a, 14b each include a length that is variable in nature to allow the water supply 18 to deliver water to the appliance 12 if the length between the appliance 12 and the water supply 18 is greater than a distance of 4 feet and over. The valves 16 includes first and second valves 16a, 16b. The first and second valves 16a, 16b are configured to control the flow of water from the first and second faucets 18a, 18b, respectively. In one example, the first and second valves 16a, 16b may be solenoid valves.

The appliance 12 includes a timer circuit 20 electrically coupled to the first and second valves 16a, 16b. The timer circuit 20 is adapted to transmit control signals to the first and second valves 16a, 16b. The timer circuit 20 is adapted to transmit the control signals to open the first and second valves 16a, 16b and to allow water to pass to the appliance 12 during various operating cycles. One or more stretch cables 22 (shown in FIGS. 2-5) are coupled between the timer circuit 20 and the first and second valves 16a, 16b. The stretch cable 22 provides the control signals to the first and second valves 16a, 16b, respectively. The stretch cable 22 includes one or more copper wires. The stretch cable 22 will be discussed in more detail in connection with FIGS. 2-3.

Hose fittings 23a, 23b may be positioned within the appliance 12 to couple the stretch hoses 14a, 14b to the appliance 12. Threaded portions of the hose fitting 23a, 23b project from the exterior of appliance 12. The stretch hoses 14a, 14b includes couplings (not shown) to couple the stretch hoses 14a, 14b to threaded portions of the hose fittings 23a, 23b. A housing 24 may be coupled to the hose fittings 23a, 23b to receive water from the first and second faucets 18a, 18b. A hose 25 is coupled to the housing 24 and delivers water to a tub (not shown).

The timer circuit 20 may transmit the control signals to the valves 16a, 16b after the user has placed the desired contents into the tub and turned the machine on. Once the tub fills to the desired water amount, the timer circuit 20 ceases to transmit the control signals thereby closing the valves 16a, 16b and stopping the flow of water to the appliance 12. The timer circuit 20 retransmits the control signals to each of the valves 16a, 16b once the rinse cycle has started to allow the tub to fill with water. After the completion of the rinse cycle, the valves 16a, 16b close thereby stopping the flow of water to the appliance 12. The valves 16a, 16b are closed during the wash and spin cycles.

Figure 2:
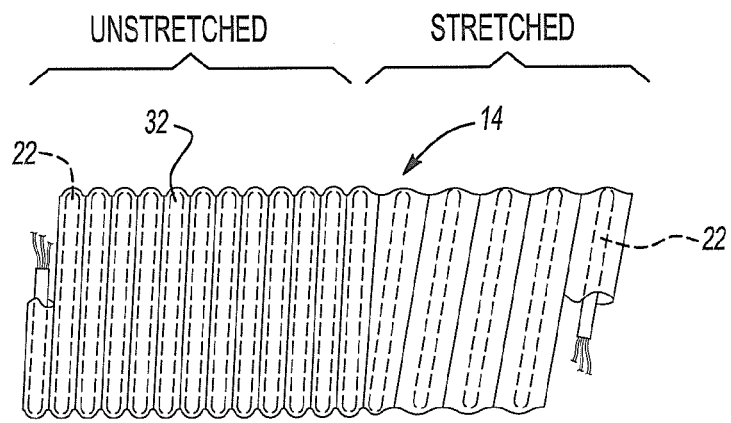
FIG. 2 depicts a perspective view of the stretch hose in accordance to one embodiment of the present invention.

FIG. 2 depicts a perspective view of the stretch hose 14 in accordance to one embodiment of the present invention. The stretch hose 14 includes a plurality of protrusions 32. The protrusions 32 of the stretch hose 14 are arranged to form a helical pattern. The stretch cable 22 (while coated) or exposed copper wires (not shown) from the stretch cable 22 may be positioned or embedded within the protrusions 32 of the stretch hose 14. The protrusions 32 may seal the stretch cable 22 or the exposed wires of the stretch cable 22 to prevent water contact. The stretch cable 22 is fixedly connected with the stretch hose 14 and extends with the stretch hose 14.

The stretch hose 14 and the stretch cable 22 are coupled to the valve 16. The stretch hose 14 and the stretch cable 22 extends as the user pulls an end of the valve 16. The stretch hose 14 and the stretch cable 22 may be adapted to extend between 4 and 8 feet, as in most cases, such lengths may be adequate to ensure that the appliance 12 is mated to the supply 18. The stretch hose 14 and the stretch cable 22 may be configured to extend to even larger distances if needed.

Figure 3:
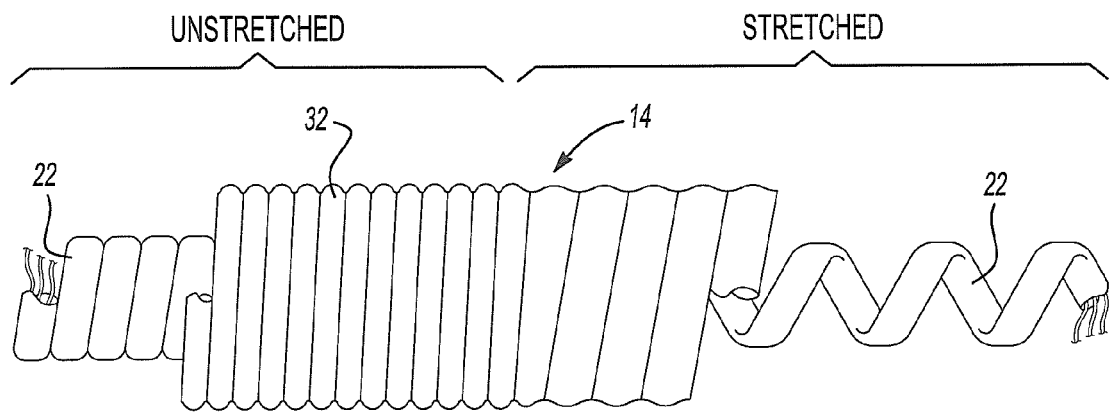
FIG. 3 depicts a perspective view of the stretch hose in accordance to another embodiment of the present invention.

FIG. 3 depicts a perspective view of the stretch hose 14 in accordance to one embodiment of the present invention. The stretch cable 22 is positioned within the stretch hose 14. The protrusions 32 on the stretch hose 14 are generally arranged to form a first helical pattern. The stretch cable 22 is coiled and generally arranged to form a second helical pattern. As noted above, the stretch hose 14 and the stretch cable 22 may be adapted to extend between 4 and 8 feet, as in most cases, such lengths may be adequate to ensure that the appliance 12 is mated to the supply 18. The stretch hose 14 and stretch cable 22 may be configured to extend to even larger distances if needed.

With the stretch hose 14 and cable 22 as shown in FIG. 3, there is no relationship or intertwining between the first helical pattern of the stretch hose 14 and the second helical pattern of the stretch cable 22. The stretch cable 22 and the stretch hose 14 are not integrated with each other. As such, the stretch cable 22 extends independently with respect to the stretch hose 14 as the user pulls the end of the valve 16 to mate the valve 16 with the supply 18. The implementation of having the stretch cable 22 separate from the stretch hose 14 may be cheaper to implement when compared to having the stretch cable 22 integrated or encapsulated into the protrusions 32 of the stretch hose 14. The stretch cable 22 as shown in FIG. 3 may be sufficiently coated to ensure that the copper wires disposed within the stretch cable 22 remains dry when water flows through the stretch hose 14. For example, the stretch cable 22 may be constructed with polyvinyl chloride (PVC) or neoprene. The copper wires disposed within the stretch cable 22 may be implemented with appropriately sized gauge wires to handle the current requirements for driving the valve 16.

Figure 4:
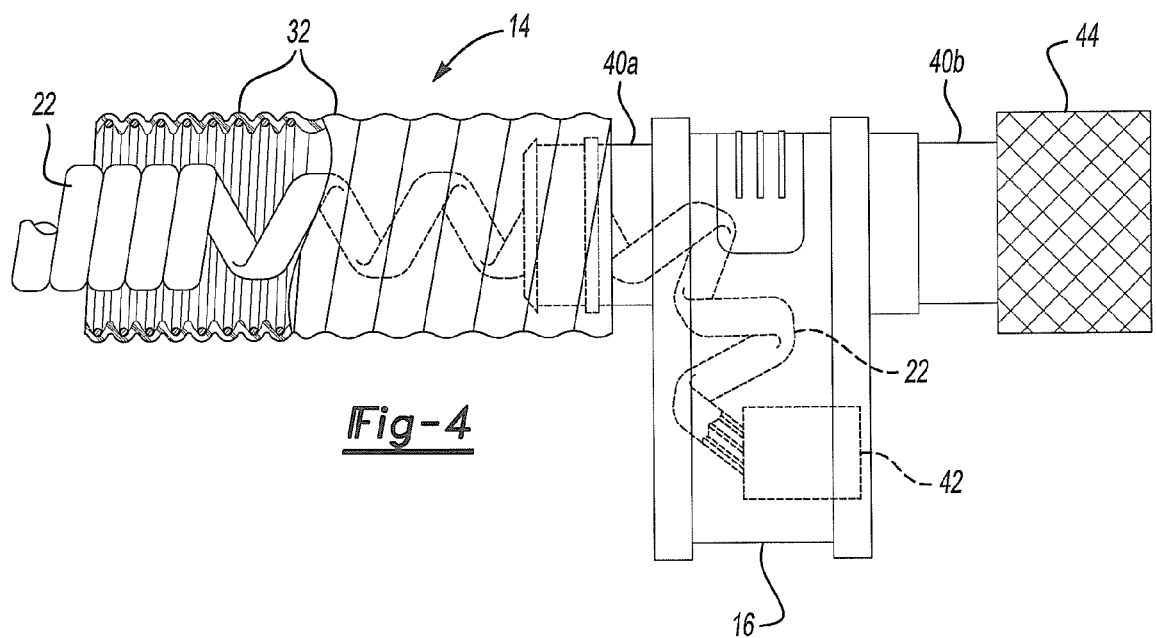
FIG. 4 depicts a side view of the stretch hose coupled to the valve where the stretch hose and cable are shown in stretched and unstretched states.

FIG. 4 depicts a perspective side view of the stretch hose 14 and the stretch cable 22 coupled to the valve 16, where the stretch cable and the stretch hose are both in a stretched and unstretched state. The valve 16 includes first and second ends 40a, 40b. In one example, a first end of the stretch hose 14 may be over molded to the first end 40a of the valve 16 to prevent the stretch hose 14 from leaking water. In another example, clamps or tie straps (not shown) may be used to fasten the first end of the stretch hose 14 over the first end 40a of the valve 16. The valve 16 includes a coil 42 for moving a plunger (not shown) to either block or allow the flow of water from the valve 16 in response to the control signals. The coil 42 may be coupled to a plastic bobbin (not shown). A steel frame (not shown) may be positioned about the coil 42 for directing a magnetic field toward the plunger when the coil 42 is energized.

The stretch cable 22 may include two wires for energizing the coil 42 and a single ground wire. The ground wire may be coupled to the steel frame in the valve 16. A portion of the valve is generally sealed from water to allow exposed wires of the stretch cable 22 to be connected to the coil 42. A coupling 44 is fastened to the second side 40b of the valve 16. The coupling 44 is generally fastened to the water supply 18.

In reference to the embodiment of the stretch hose 14 and the stretch cable 22 as shown in connection with FIG. 2, the stretch cable 22 may project from the protrusions 32 of the stretch hose 14 and pass through the first end 40a of the valve 16. In one example, a notch or hole may be formed in the first end 40 to allow the stretch cable 22 to pass therethrough. The sealed portion of the valve 16 may receive the exposed wires of the stretch cable 22 to facilitate the connection between the timer circuit 20 and the coil 42. In another example, the stretch cable 22 may project through the exterior surface of stretch hose 14 (via the protrusions 32) such that the stretch cable 22 does not come into contact with water. The stretch cable 22 may pass from the exterior surface of the stretch hose 14 and into the sealed portion of the valve 16 to connect with the coil 42. A hole or notch may be formed on the sealed portion of the valve 16 to allow the stretch cable 22 to pass therethrough.

Figure 5:
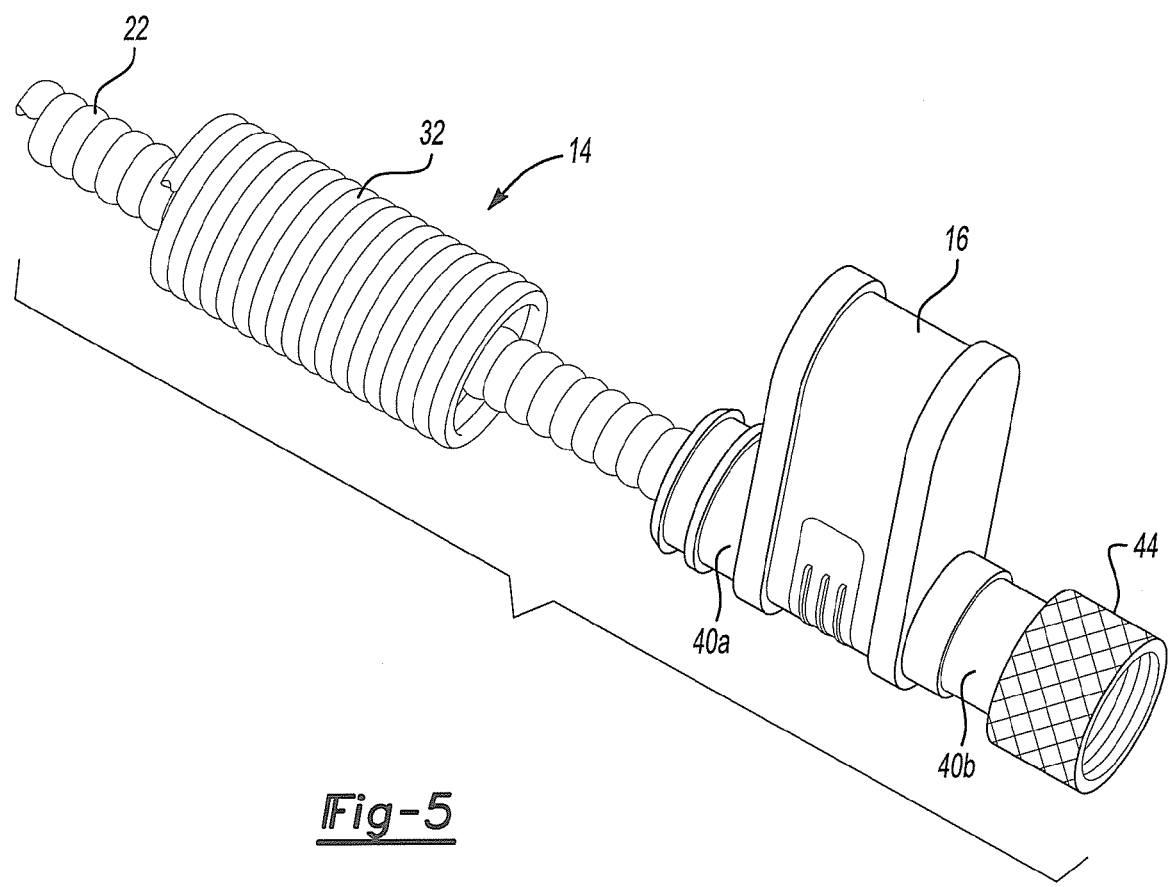
FIG. 5 depicts an exploded perspective view of the stretch hose, the stretch cable and the valve where the stretch hose and stretch cables are in an unstretched state.

FIG. 5 depicts an exploded side view of the stretch hose 14 and the stretch cable 22 coupled to the valve 16, where the stretch hose 14 and the stretch cable 22 are shown in the unstretched state.

In general, the system 10 may provide for a water control system of an electrical household appliance that provides the user with the ability to extend a hose 14 and any associated wiring for the valve 16 in order to mate the appliance 12 to the water supply 18. The system 10 may prevent the stretch hose 14 from being exposed to high amounts of water pressure thereby reducing the likelihood for the stretch hose 14 to burst. When water is flowing through the stretch hose 14 during fill and rinse cycles, the stretch hose 14 may be exposed to small amount of water pressure or no water pressure at all. In addition, the use of the stretch hose 14 may not be as expensive as steel braided hoses that may be used to eliminate hose bursts due to increased amounts of water pressure in the water supply.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flow control system for a water supply that provides water to household and commercial establishments, the system comprising:
    a washing appliance being in fluid communication with the supply, wherein the appliance includes a timer circuit that is configured to generate one or more control signals;
    a valve positioned external to the appliance and coupled to the supply to control a flow of water to the appliance in response to the control signals,
    a stretch cable coupled between the valve and the appliance for delivering the control signals to the valve; and
    a stretch hose coupled to the valve and the appliance for delivering water to the appliance and capable of being extended from a first length to a second length between the valve and the appliance, wherein the stretch cable is positioned within the stretch hose and is capable of being extended between the first length and the second length independent of the stretch hose.

2. The system of claim 1 wherein the second length is between a 1:1 to 2:1 ratio of the first length.

3. The system of claim 1 wherein the second length is substantially longer than the first length.

4. The system of claim 1 wherein the stretch cable is coiled.

5. The system of claim 1 wherein the stretch cable is not fixedly connected with the stretch hose.

6. The system of claim 1 wherein the entire stretch cable positioned within the stretch hose is capable of being exposed to water.

7. The system of claim 1 wherein the valve includes a sealed portion and one or more coils positioned in the sealed portion and the stretch cable passes internally through the valve from the stretch hose such that exposed wires of the stretch cable are coupled to the coils.

8. The system of claim 1 wherein the stretch hose is over molded to the valve.

9. A fluid delivery system for use with a washing appliance including a timer circuit to generate control signals, the washing appliance being in fluid communication with a water supply that provides water and a valve coupled to the supply to control a flow of water to the appliance in response to the control signal, the fluid delivery system comprising:
    a stretch cable coupled between the valve and the appliance and capable of delivering the control signals to the valve; and
    a stretch hose coupled to the valve and the appliance for delivering water to the appliance and capable of being extended from a first length to a second length between the valve and the appliance, wherein the stretch cable is positioned within the stretch hose and is capable of being extended between the first length and the second length independent of the stretch hose.

10. The system of claim 9 wherein the second length is between a 1:1 to 2:1 ratio of the first length.

11. The system of claim 9 wherein the second length is substantially longer than the first length.

12. The system of claim 9 wherein the stretch cable is not fixedly connected with the stretch hose.

13. The system of claim 9 wherein the entire stretch cable positioned within the stretch hose is capable of being surrounded by water.

14. The system of claim 9 wherein the valve includes a sealed portion and one or more coils positioned in the sealed portion and the stretch cable passes internally through the valve from the stretch hose such that exposed wires of the stretch cable are coupled to the coils.

15. The system of claim 9 wherein the stretch hose is over molded to the valve.

16. A fluid delivery system for use with a washing appliance including a timer circuit to generate control signals, the appliance being in fluid communication with a supply that provides water, and a valve coupled to the supply to control a flow of water to the appliance in response to the control signals, the fluid delivery system comprising:
    a stretch cable coupled between the valve and the appliance and capable of delivering the control signals to the valve; and
    a stretch hose having a plurality of protrusions coupled to the valve and the appliance for delivering water to the appliance and capable of being extended from a first length to a second length between the valve and the appliance, wherein the stretch cable is within the stretch hose and separate from the protrusions and extends between the first length and the second length independent of the stretch hose.

17. The system of claim 16 wherein the second length is between a 1:1 to 2:1 ratio of the first length.

18. The system of claim 16 wherein the valve includes a sealed portion and one or more coils positioned in the sealed portion and the stretch cable passes internally through the valve from the stretch hose such that exposed wires of the stretch cable are coupled to the coils.

19. The system of claim 16 wherein the stretch hose is over molded to the valve.

20. The system of claim 16 wherein the second length is substantially longer than the first length.

* * * * *